(12) United States Patent
Arai

(10) Patent No.: US 8,319,147 B2
(45) Date of Patent: Nov. 27, 2012

(54) LASER MACHINING METHOD AND LASER MACHINING APPARATUS

(75) Inventor: Kunio Arai, Ebina (JP)

(73) Assignee: Hitachi Via Mechanics, Ltd., Kanagawa (JP)

( * ) Notice: Subject to any disclaimer, the term of this patent is extended or adjusted under 35 U.S.C. 154(b) by 1533 days.

(21) Appl. No.: 11/525,154

(22) Filed: Sep. 22, 2006

(65) Prior Publication Data

US 2007/0075059 A1  Apr. 5, 2007

(30) Foreign Application Priority Data

Sep. 30, 2005 (JP) .................................. 2005-288973
Sep. 11, 2006 (JP) .................................. 2006-246020

(51) Int. Cl.
*B23K 26/38* (2006.01)
(52) U.S. Cl. ............ 219/121.71; 219/121.77; 219/121.8
(58) Field of Classification Search .......... 219/121.67–121.72, 121.76, 121.77, 219/121.79
See application file for complete search history.

(56) References Cited

U.S. PATENT DOCUMENTS

| | | | | |
|---|---|---|---|---|
| 3,237,488 A * | 3/1966 | Parone et al. | ................. | 408/230 |
| 4,283,259 A * | 8/1981 | Melcher et al. | ................. | 205/646 |
| 5,319,183 A * | 6/1994 | Hosoya et al. | ............ | 219/121.68 |
| 6,355,907 B1 * | 3/2002 | Kuehnle et al. | ............ | 219/121.7 |
| 6,407,363 B2 * | 6/2002 | Dunsky et al. | ............ | 219/121.71 |
| 6,462,306 B1 * | 10/2002 | Kitai et al. | ................. | 219/121.77 |
| 6,642,480 B2 * | 11/2003 | Amako et al. | ............ | 219/121.75 |
| 6,657,159 B2 * | 12/2003 | McKee et al. | ............ | 219/121.71 |
| 6,804,269 B2 * | 10/2004 | Lizotte et al. | ..................... | 372/9 |
| 6,849,824 B2 | 2/2005 | Arai et al. | | |
| 6,864,459 B2 * | 3/2005 | Chang et al. | ............. | 219/121.71 |
| 6,946,620 B2 * | 9/2005 | Amako et al. | ........... | 219/121.75 |
| 7,057,133 B2 * | 6/2006 | Lei et al. | .................. | 219/121.71 |
| 7,193,175 B1 * | 3/2007 | Chang et al. | ............. | 219/121.71 |
| 7,666,759 B2 * | 2/2010 | Couch et al. | .................. | 438/463 |
| 7,675,002 B2 * | 3/2010 | Nomaru et al. | ............ | 219/121.7 |
| 2003/0042230 A1 * | 3/2003 | Gross et al. | ................ | 219/121.7 |

FOREIGN PATENT DOCUMENTS

| | | |
|---|---|---|
| CN | 1511672 | 7/2004 |
| JP | 4-333387 | 11/1992 |
| JP | 6-37376 | 2/1994 |
| JP | 9-107168 | 4/1997 |
| JP | 2003-136270 | 5/2003 |
| JP | 2004-249364 | 9/2004 |
| JP | 2004-344961 | 12/2004 |
| WO | WO9616767 A1 * | 6/1996 |

OTHER PUBLICATIONS

Japanese Office Action dated Dec. 14, 2010 in Japanese Patent Application No. 2006-246020 together with English translation thereof (Notice of Reasons of Refusal).

* cited by examiner

*Primary Examiner* — Samuel M Heinrich
(74) *Attorney, Agent, or Firm* — Wenderoth, Lind & Ponack, L.L.P.

(57) ABSTRACT

There is provided a laser machining method and a laser machining apparatus whose machining accuracy and quality excel without lowering machining efficiency. One hole is machined by a split beam that is a first pulsed laser beam and another split beam that is a second pulsed laser beam whose irradiation position is determined based on irradiation position of the first laser beam. In this case, the machining quality may be improved by machining the circular hole by equalizing circling directions and angular velocity of the split beams. A beam splitter splits a laser beam outputted out of one laser oscillator into the split beams and AOMs can time-share them.

8 Claims, 13 Drawing Sheets

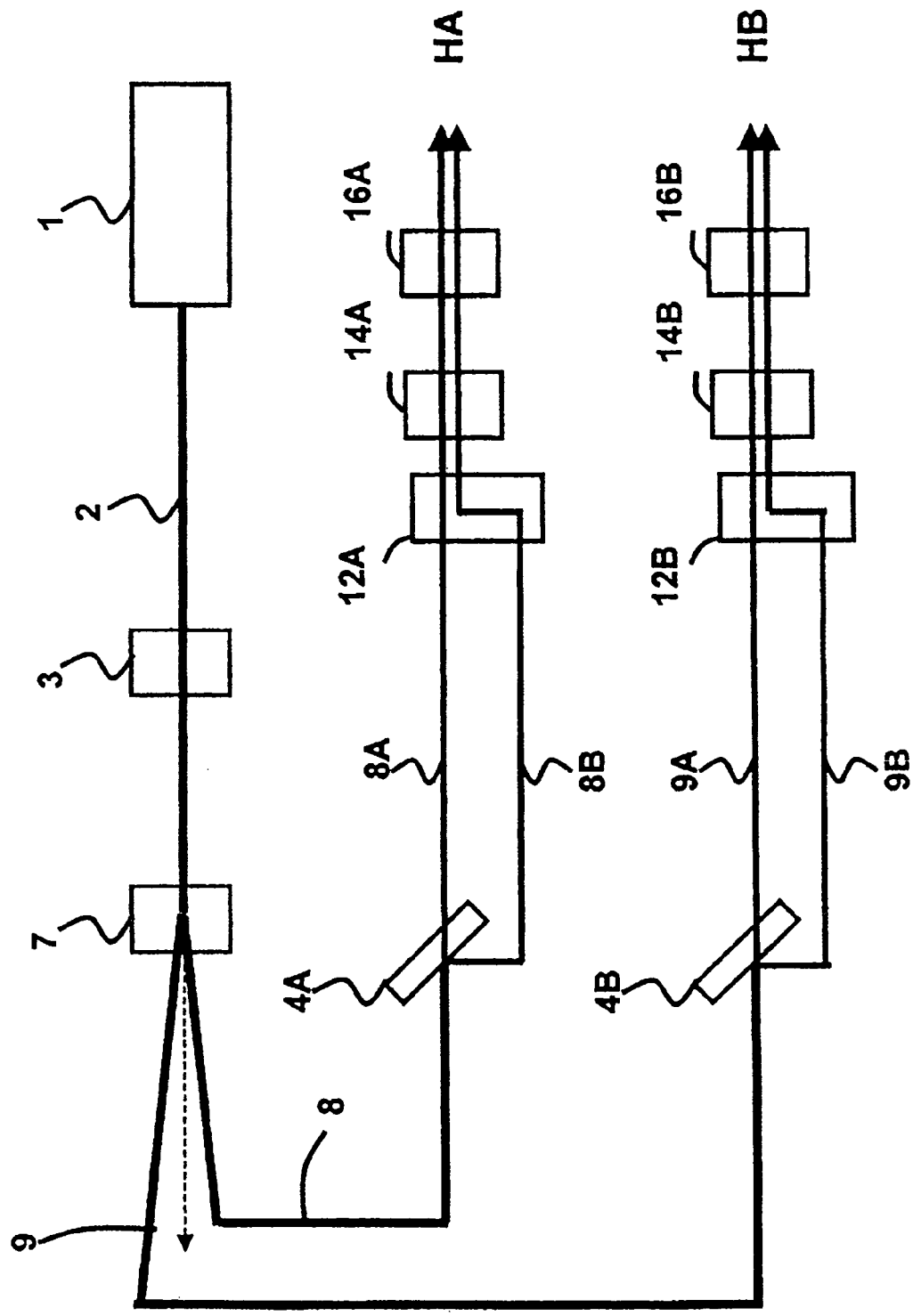

LASER MACHINING METHOD AND LASER MACHINING APPARATUS

BACKGROUND OF THE INVENTION

1. Field of the Invention

The present invention relates to a laser machining method and a laser machining apparatus for machining holes on a workpiece by irradiating pulsed laser beams to the workpiece.

2. Related Art

Conventionally, a laser machining method is arranged so as to concurrently machine two holes by a first optical mirror system composed of a pair of rotary mirrors and a second optical mirror system composed of a rotary mirror and a rotary polarizing beam mixer by concurrently inputting an S-polarized second laser beam and a P-polarized first laser beam to one fθ lens as disclosed in Japanese Patent Laid-Open No. 2004-249364 for example.

In case of $CO_2$ laser for example, a material that is liable to absorb the $CO_2$ laser may be efficiently machined because it is possible to increase energy density of the laser beam. However, it is difficult to machine a copper plate because its surface reflects most of the $CO_2$ laser when the $CO_2$ laser is irradiated to the copper plate. Then, in the case of machining a via hole for an electrically connecting surface and inner copper conductive layers (referred to as 'copper layers' hereinafter) formed respectively on the surface and inside of a printed circuit board in which the copper layers and a resin layer (an insulating layer made of resin or of resin and glass fibers, referred to as 'insulating layer' hereinafter) are laminated, a hole is made on the surface copper layer in advance and a laser beam is irradiated to the hole to remove any insulating substance and to make the via hole reach to the inner copper layer. Therefore, this method has required many machining steps.

Meanwhile, because UV laser light is liable to be absorbed by many materials such as metals, organic and inorganic materials, it can machine a composite material relatively easily as compared to the $CO_2$ laser. Therefore, it is unnecessary to make a hole through the surface copper layer in advance and thus a number of machining steps may be reduced in machining a via hole for electrically connecting the surface and inner copper layers of a printed circuit board. Then, the machining method using the UV laser is becoming the main stream process in machining printed circuit boards.

In the case of the UV laser, its energy per one pulse is small even though oscillating frequency of a laser oscillator is high. However, it can efficiently machine a copper layer for example even though the energy per one pulse is small by contracting an outer diameter of the laser beam and by increasing energy density per unit area. However, there is a case in which the bottom of the copper layer melts and a through hole is made if the energy density is too high.

For example, a hole of 40 μm in diameter for connecting copper layers on the surface and inside of a printed circuit board in which the copper layers and an insulating layer are laminated can be made by burst machining (a machining method of repeatedly irradiating a laser beam to the same position, and which is referred to as punching here because it is similar to punching) by using the UV laser of the same diameter, i.e., 40 μm. It is noted that the energy density in machining the copper layer is 8 $J/cm^2$, the energy density in machining the insulating layer is 1 $J/cm^2$ and pulse frequency is 30 KHz.

(1) In the case of machining the surface copper layer when a thickness thereof is 5 μm or less and a thickness of the insulating layer is 25 μm or more:

Delamination occurs at the boundary of the surface copper layer and the insulating layer and the copper layer tends to delaminate if the laser beam is irradiated successively for more than a certain number of times. That is, it is necessary to limit the number of times of irradiation to a number set in advance in order not to cause any delamination at the boundary of the copper layer and the insulating layer.

(2) In the case of machining the surface copper layer when the thickness of the surface copper layer is 5 μm or more and the thickness of the insulating layer is 25 μm or more:

Irradiating the laser beam successively for more than a certain number of times damages the insulating layer under the copper layer, thus enlarging an overhang of the surface copper layer and worsening adhesion of plating. That is, it is necessary to limit the number of times of irradiation to a number set in advance in order to reduce the overhang of the copper layer.

(3) In the case of machining the insulating layer when the insulating layer is made of only resin:

Irradiating the laser beam successively for more than a certain number of times makes a hole in the shape of a beer barrel. That is, it is necessary to limit the number of times of irradiation to a number set in advance in order to form a hole whose sidewall is straight.

(4) In the case of machining the insulating layer when the insulating layer contains glass fibers:

Irradiating the laser beam successively for more than a certain number of times makes a hole in the shape of a beer barrel in which the glass fibers protrude into the hole. That is, it is necessary to limit the number of times of irradiation to a number set in advance in order to form a hole whose sidewall is smooth and is straight.

Still more, the copper layer tends to delaminate from the insulating layer when an irradiation pitch (intervals of irradiation position of the laser beam, which is also called a pulse pitch) is reduced also in trepanning (a method of machining a hole whose diameter is larger than that of the laser beam by irradiating the laser beam by a plurality of times on a circumferential orbit) under the same conditions with those described above.

Therefore, it becomes necessary to prevent the copper layer from delaminating from the insulating layer without lowering the machining efficiency and while preventing concentration of heat in any cases as a laser machining method.

Then, in case of (1) described above for example, machining quality has been maintained by repeating cyclic machining, i.e., irradiating the laser beam by a number of pulses set in advance to each machining hole in a set of a plurality of holes, by a necessary number of times.

A concrete machining time may be set in the case of the cyclic machining as follows.

It is necessary to irradiate the laser beam by 40 pulses in machining the insulating layer of 40 μm thick and made of only resin with a pulse frequency of 30 kHz and energy density of 1 $J/cm^2$. Here, a time necessary for positioning the optical mirror is presumed to be 2 kHz. It is also presumed to machine a plurality of holes concurrently while irradiating 10 pulses each to one hole. In this case, it takes 3.2 ms to machine one hole because the number of times of positioning of the optical mirror is four, and four times machining is carried out per each machining hole. Still more, it takes 5.1 ms to machine one hole in the case of irradiating five pulses each to one hole because 8 times of positioning and 8 times of machining are carried out.

Still more, the larger the diameter of the laser beam (beam diameter) and the higher the machining speed, the more the amount of decomposed scattering substance increases in unit time. Then, when the laser beam passes through the decomposed scattering substance at high temperature, index of refraction of the laser beam may vary. Then, due to that, there is a case in which a beam mode changes and precision of shape of the machined hole deteriorates. That is, although it is possible to make a hole whose wall face is steep, i.e., a hole whose bottom diameter is close to an entrance diameter, when the beam mode is a Gaussian mode (laser beam whose energy intensity is in a shape of Gaussian line), there is a case in which the bottom diameter of the hole is much smaller than the entrance diameter when the beam mode changes. Accordingly, the laser machining method is also required to suppress the generation of the decomposed scattering substance without lowering the machining efficiency.

Accordingly, it is an object of the invention to provide a laser machining method and a laser machining apparatus for machining workpieces while keeping excellent machining accuracy and quality without lowering their machining efficiency.

SUMMARY OF THE INVENTION

However, it takes a long machining time when the cyclic machining is adopted because a number of times of positioning increases when a number of times of irradiation at one time is reduced to improve the machining quality. Therefore, the inventors carried out various tests to solve the above-mentioned problem and obtained the following results.

It is effective to reduce the diameter of the laser beam in order to improve the shape of the sidewall and the quality of the hole. That is, the beam diameter and energy density that cause no delamination of the copper layer and insulating layer and that allow the copper layer to have no overhang in machining the copper layer are 30 μm or less (ideally 25 μm or less) and 14 J/cm$^2$ or less (or ideally 10 J/cm$^2$ or less), respectively. It was then found the following matter. That is, under such conditions, the quality of the hole is not damaged even if the pulses are successively irradiated in a range of machining only the copper layer and that in machining the insulating layer, the quality of the sidewall is improved and the bottom diameter of the hole may be brought closer to the entrance diameter with energy density of 1.5 J/cm$^2$ or less (or ideally 1.0 J/cm$^2$ or less) and a number of successive pulses of 10 pulses or less (or ideally 5 pulses or less) when the insulating layer is made of only resin. Still more, the hole in which glass fibers that protrude into the hole are short and whose sidewall is straight may be made and the bottom diameter of the hole may be brought closer to the entrance diameter with energy density of 2 to 6 J/cm$^2$ or less (or ideally 2 to 4 J/cm$^2$ or less) and a number of successive pulses of 5 pulses or less (or ideally 3 pulses or less) when the insulating layer is made of resin containing glass fibers.

Further, although a method of machining a workpiece by inputting a plurality of laser beams to one fθ lens had been known since the past, the inventors noticed that it is difficult to improve both the machining quality and machining efficiency by machining one hole by one laser beam like the past one.

From the result described above, according to a first aspect of the invention, there is provided a laser machining method for machining one hole by a first pulsed laser beam and a second pulsed laser beam whose irradiation position is determined based on the irradiation position of the first laser beam.

According to a second aspect of the invention, there is provided a laser machining method in which irradiation is carried out by setting in advance a maximum value L of irradiation interval of the laser beam, an allowable number of times N in successively irradiating the laser beam and a rest period of time $T_0$, and when the interval between the adjacent irradiation positions is less than the maximum value L, the irradiation is rested for the rest period of time $T_0$ after irradiating the laser beam by the number of times N and then irradiation of the laser beam is started again.

According to a third aspect of the invention, there is provided a laser machining apparatus, having a laser oscillator, a beam splitter for splitting incident light into two directions, first and second acousto-optical elements for time-sharing the incident light into two directions, and first and second machining heads. The beam splitter splits the laser beam outputted out of the laser oscillator into two beams and inputs one beam into the first acousto-optical element and another beam into the second acousto-optical element. The first acousto-optical element supplies one of the time-shared laser beams to the first machining head and the other one to the second machining head, and the second acousto-optical element supplies one of the time-shared laser beams to the first machining head and the other one to the second machining head.

Because one hole is machined by two laser beams in trepanning for example, heat input at one hole may be halved for example even if machining efficiency is kept the same. Still more, because irradiation position may be separated, an increase of temperature at the machining hole may be reduced and thus machining with excellent quality may be achieved.

Still more, because the ability of the laser oscillator may be fully utilized even if the response frequency of the optical mirror is lower than the oscillating frequency of the laser beam (½ for example) by time-sharing the laser beam, the machining efficiency may be improved.

It is noted that the summary of the invention described above does not necessarily describe all necessary features of the invention. The invention may also be a sub-combination of the features described above.

BRIEF DESCRIPTION OF THE DRAWINGS

FIG. 13 is a diagram showing a configuration of an optical system of a fourth laser machining apparatus that can be suitably applied to the present invention.

DETAILED DESCRIPTION OF THE INVENTION

The invention will be explained in detail below.

First Embodiment

Figure 1:
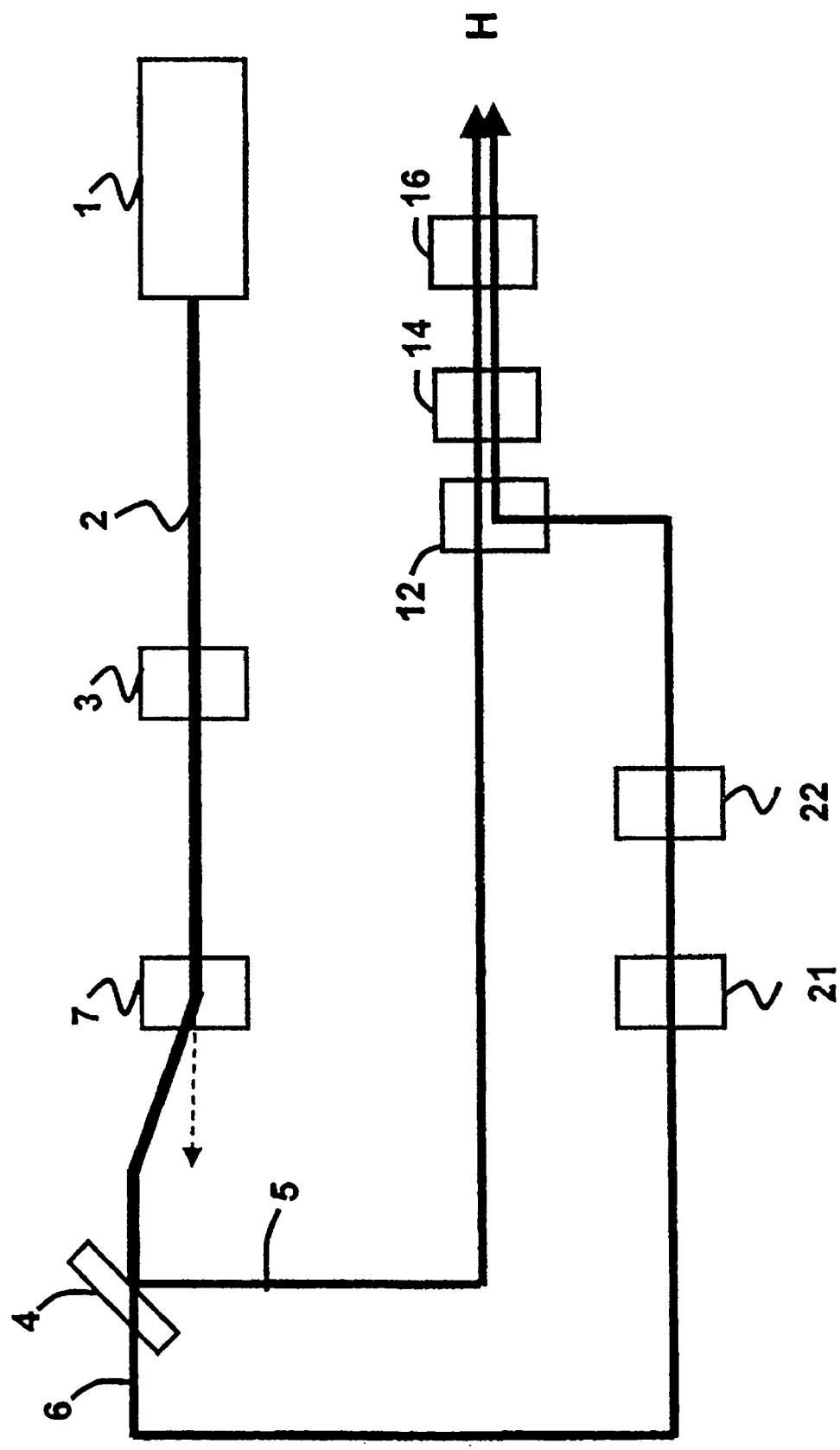
FIG. 1 is a diagram showing a configuration of an optical system of a first laser machining apparatus that can be suitably applied to the present invention.

FIG. 1 is a diagram showing a configuration of an optical system of a first laser machining apparatus suitably applied to the present invention.

A laser oscillator 1 outputs a P-polarized UV laser beam having frequency F (here 30 KHz). A pulse beam 2 outputted out of the laser oscillator 1 passes through a beam-diameter adjuster 3 that adjusts an outer diameter of the beam and an acousto-optic pulse modulator (AOM, also called an acousto-optic element) 7 that controls pulse energy and then enters a beam splitter 4. It is noted that the AOM 7 can also control the direction of the pulse beam 2 whether it is transmitted in an incident direction as it is (indicated by a dotted line in the figure) or it is lead to an optical path switched from the incident direction.

The beam splitter 4 reflects 50% of the pulse beam 2 as a split beam 5 and transmits the remainder as a split beam 6. The split beam 5 enters an XY galvanic unit 12 of a head H and the split beam 6 enters a polarizing means 21 that shifts (rotates) a polarizing direction by 90 degrees and then enters the XY galvanic unit 12 as a S-polarized pulse beam. It is noted that an optical-length switching unit 22 is provided between the polarizing means 21 and the galvanic unit 12 so as to be able to switch optical length of the split beam 6. The optical-length switching unit 22 is arranged so as to be able to select among cases when the optical length of the split beam 6 is equal to that of the split beam 5 (optical path of equal diameter) and when the optical length of the split beam 6 is longer than that of the split beam 5 (optical path of expanded diameter). When the optical-length switching unit 22 is set on the side of the optical path of equal diameter, the beam diameter of the split beam 5 and the split beam 6 becomes equal. When the optical-length switching unit 22 is set on the side of the optical path of expanded diameter, the beam diameter of the split beam 6 becomes larger, e.g., two times, than that of the split beam 5. That is, it is possible to reduce the energy density of the split beam 6, e.g., to a quarter, without changing the output of the laser oscillator 1 by setting the optical-length switching unit 22 on the side of the optical path of expanded diameter.

Because the first split beam 5 is a P wave, it transmits through the XY galvanic unit 12 (that is, it is not positioned by the XY galvanic unit 12) and enters a XY galvanic unit 14. It is positioned by the XY galvanic unit 14 and enters a condensing fθ lens 16 that leads an optical axis of the beam in a direction vertical to the workpiece.

Because the second split beam 6 is an S wave in contrast to the first split beam 5, it is positioned by the XY galvanic unit 12 (with 2 mm×2 mm in terms of machining area and 0.5 degrees or less in terms of galvanic operation angle here) and enters the XY galvanic unit 14. It is further positioned by the XY galvanic unit 14 and enters the condensing fθ lens 16 that leads an optical axis of the beam in the direction vertical to the workpiece. It is noted that energy strength of the second split beam 6 and the first split beam 5 is equal. In the first embodiment, the first split beam 5 will be referred to as a 'primary beam' and the second split beam 6 as a 'secondary beam' hereinafter.

The secondary beam is synchronized with the primary beam in this configuration, so that machining speed is determined by a time required for positioning the optical mirrors 12 and 14. Then, because a time required for positioning the secondary beam is shorter than a time required for positioning the primary beam, the machining speed is determined substantially by the time required for positioning the primary beam.

Next, a procedure for irradiating the laser beam of the invention will be explained by exemplifying a case when a circular hole having a diameter larger than that of the laser beam is made (trepanning).

Figure 2:
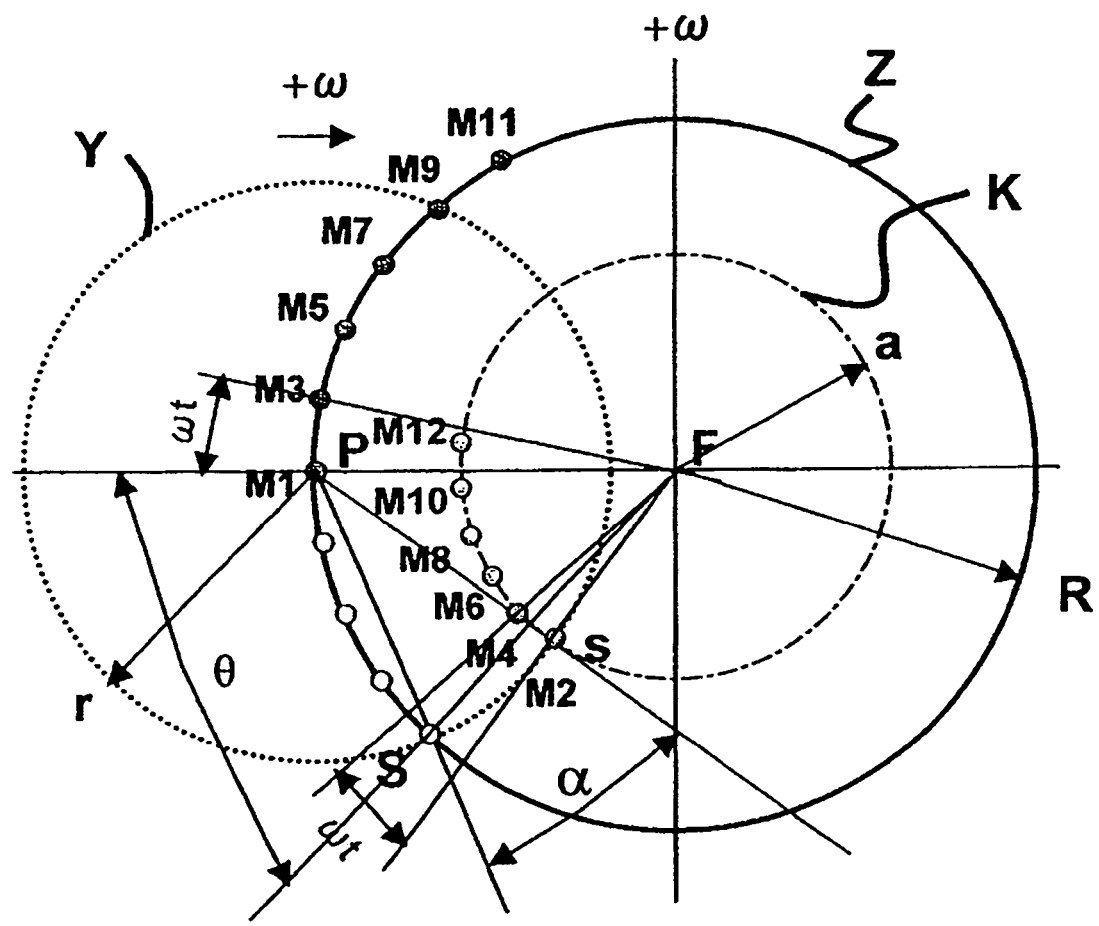
FIG. 2 is an irradiation orbit chart showing a procedure for irradiating laser beams of the invention.

Two-Beams and Two-Orbits Trepanning FIG. 2 is an irradiation orbit chart showing the procedure for irradiating the laser beams of the invention.

In the figure, Z indicated by a solid line is an orbit of the primary beam 5 that is a circular orbit with radius R centering on a center F of the hole. Y indicated by a dotted line is an orbit of the secondary beam 6 that is a circular orbit with radius r centering on a point P on the orbit Z.

An angle θ is an angle (∠ PFS) between a straight line PF and a straight line FS that passes through an intersection S of the circular orbits Z and Y.

An angle α is an angle for shifting the secondary beam 6 in the radial direction with respect to the primary beam 5, i.e., an angle that positions a point s at the angle α from the intersection S on the circular orbit Y. At this time, the point s is located at distance a from the center F. It is noted that the angle α is plus when a direction of the shift is clockwise and is minus when the direction is counterclockwise.

When the primary beam 5 is irradiated at P in the figure at first (irradiation point M1 in the figure), the secondary beam 6 is irradiated to s (M2) in the figure in the same time. Next, the primary beam 5 and the secondary beam 6 are moved in the same direction (clockwise here) on the respective orbits at an angular velocity of ω and the laser beam is irradiated when the optical axis of the primary beam 5 is positioned at M3 in the figure. Then, the secondary beam 6 is irradiated to M4 in the figure in the same time. Because each moved angle ω is the same after an elapse of time t and ∠FPs formed between s and S seen from P on the straight line FP is always constant, the secondary beam 6 may be irradiated on a circular orbit K (a dotted chain line in the figure) of a radius a centering on the center F of the hole at equal intervals by irradiating the primary beam 5 on the orbit Z at equal intervals. The lasers are irradiated in the same manner hereinafter.

Because the present embodiment allows the two laser beams to be irradiated in the same time, it is possible to improve the machining efficiency by two times even if the time for positioning the optical mirror is the same as in the conventional process. Still more, it allows the two laser beams to be irradiated at the separated positions on the circular orbits Z and K, it moderates an increase of temperature of the machining hole and thus improves the machining quality.

Still more, the laser beams are irradiated while always rocking (moving) the optical mirror, i.e., the optical mirror is not fixed at a desirable position. Therefore, it is possible to increase the speed of response frequency in positioning the optical mirror by 5 to 15 times as compared to the case of fixing the optical mirror at a desirable position.

Further, it is easy to control positioning as compared to the case of irradiating laser beams while separating the laser beam irradiation positions on one orbit.

Still more, because positioning time of the secondary beam 6 is less than that of the primary beam 5, it is possible to reduce the positioning time as compared to a case of positioning the optical mirrors separately.

Figure 3:
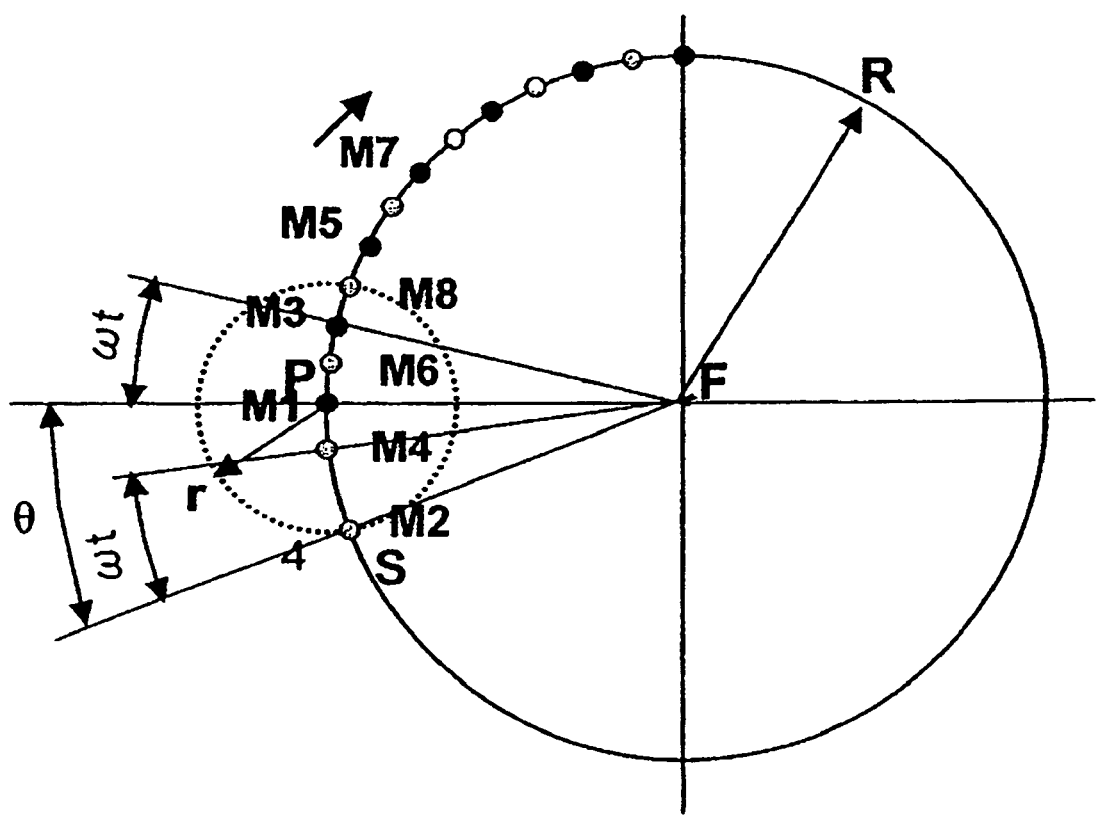
FIG. 3 is another irradiation orbit chart showing another procedure for irradiating the laser beams of the invention.

Here, it is possible to set orbits shown in FIGS. 3 through 8 by variously selecting values of the radius R of the circular orbit Z, the radius r of the circular orbit Y, the angle $\theta$ and the angle $\alpha$. That is:

(a) Setting those values as $\theta=\pi/8$, $\alpha=0$ and $r=2R\cdot\sin \pi/16$ allows the primary beam 5 and the secondary beam 6 to be irradiated at positions separated by $\pi/12$ and the irradiation interval of the primary beam 5 and 6 to be shifted by ½, i.e., the irradiation position of the secondary beam 6 to be disposed at the middle of the irradiation position of the primary beam 5 (orbit of two-beams and same orbit trepanning) as shown in FIG. 3.

Thereby, the irradiation intervals of the laser beams may be widened in terms of time and distance (here, the secondary beam 6 is shifted with respect to the primary beam 5 by 1.5 pitch in the circumferential direction), so that the increase of temperature at the machining hole becomes moderate and the machining quality may be improved. It is noted that FIG. 3 shows a case of irradiating the laser beams per $\pi/12$ of rotation angle.

Figure 4:
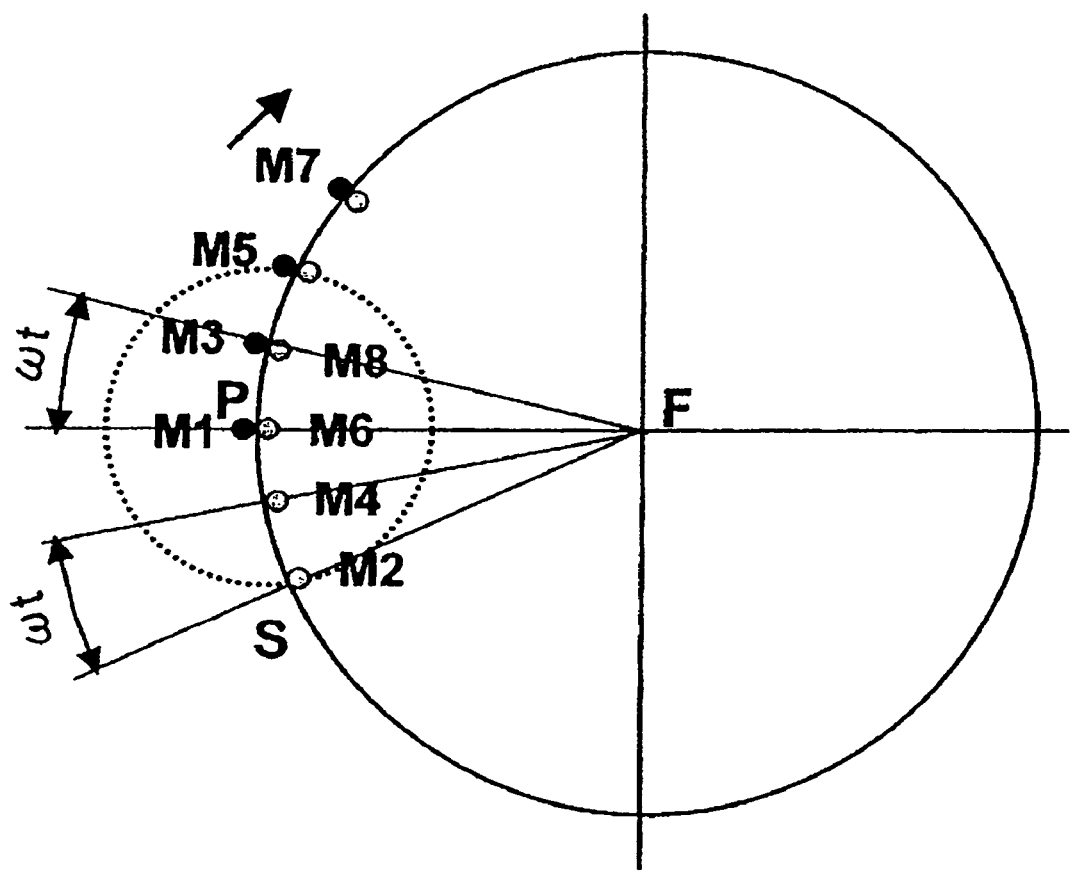
FIG. 4 is still another irradiation orbit chart showing still another procedure for irradiating the laser beams of the invention.

(b) Setting those values as $\theta=\pi/6$, $\alpha=0$ and $r=2R\cdot\sin \pi/12$ allows the irradiation position of the primary beam 5 and the secondary beam 6 to be equalized (however, irradiation time is different) on the orbit Z as shown in FIG. 4 (orbit of two-beams and same orbit trepanning). Accordingly, it is possible to improve the machining quality in the same manner with the case of FIG. 2. It is noted that FIG. 4 shows a case of irradiating the laser beams per $\pi/12$ of rotation angle.

Figure 5:
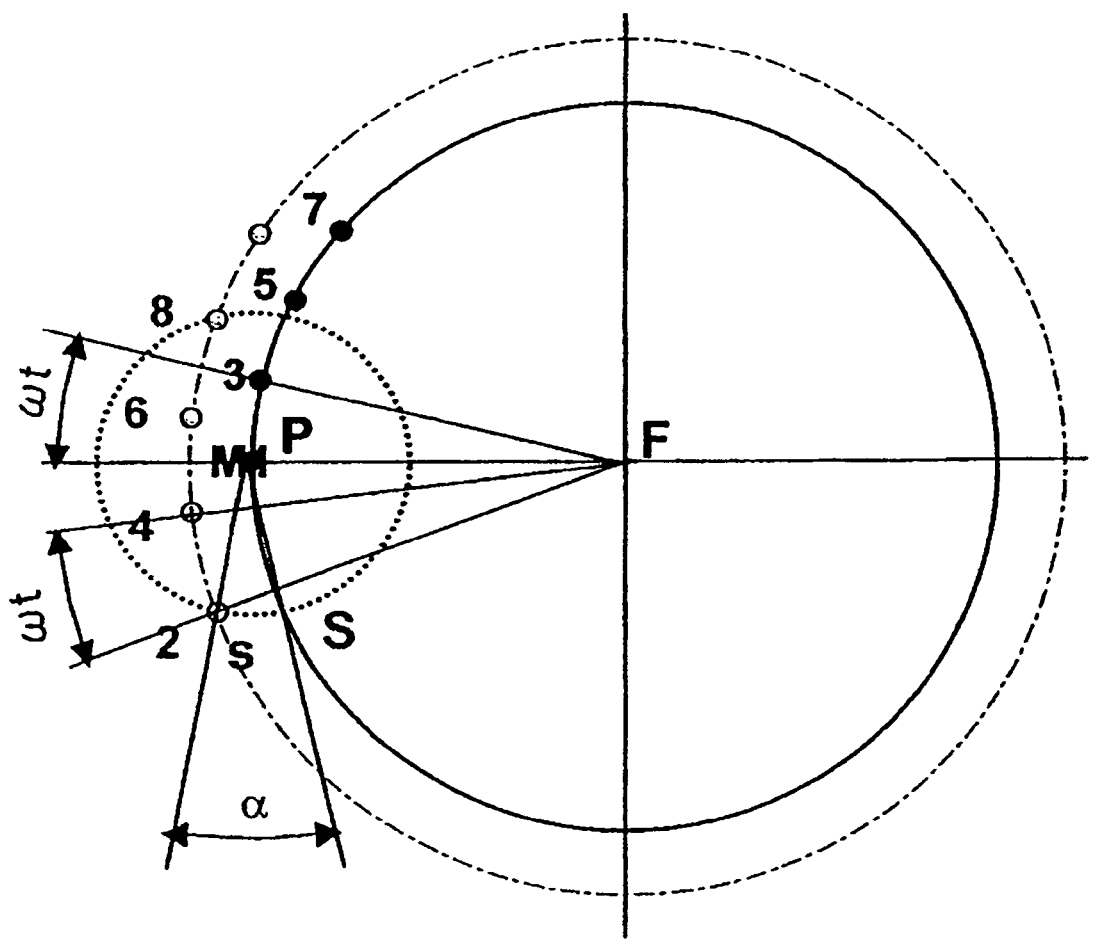
FIG. 5 is a further irradiation orbit chart showing a further procedure for irradiating the laser beams of the invention.

(c) Setting those values as $\theta=\pi/6$ and $\alpha=-\pi/7.5$, allows the circular orbit Y of the secondary beam 6 to be disposed on the outside of the circular orbit Z of the primary beam 5 as shown in FIG. 5.

Figure 6:
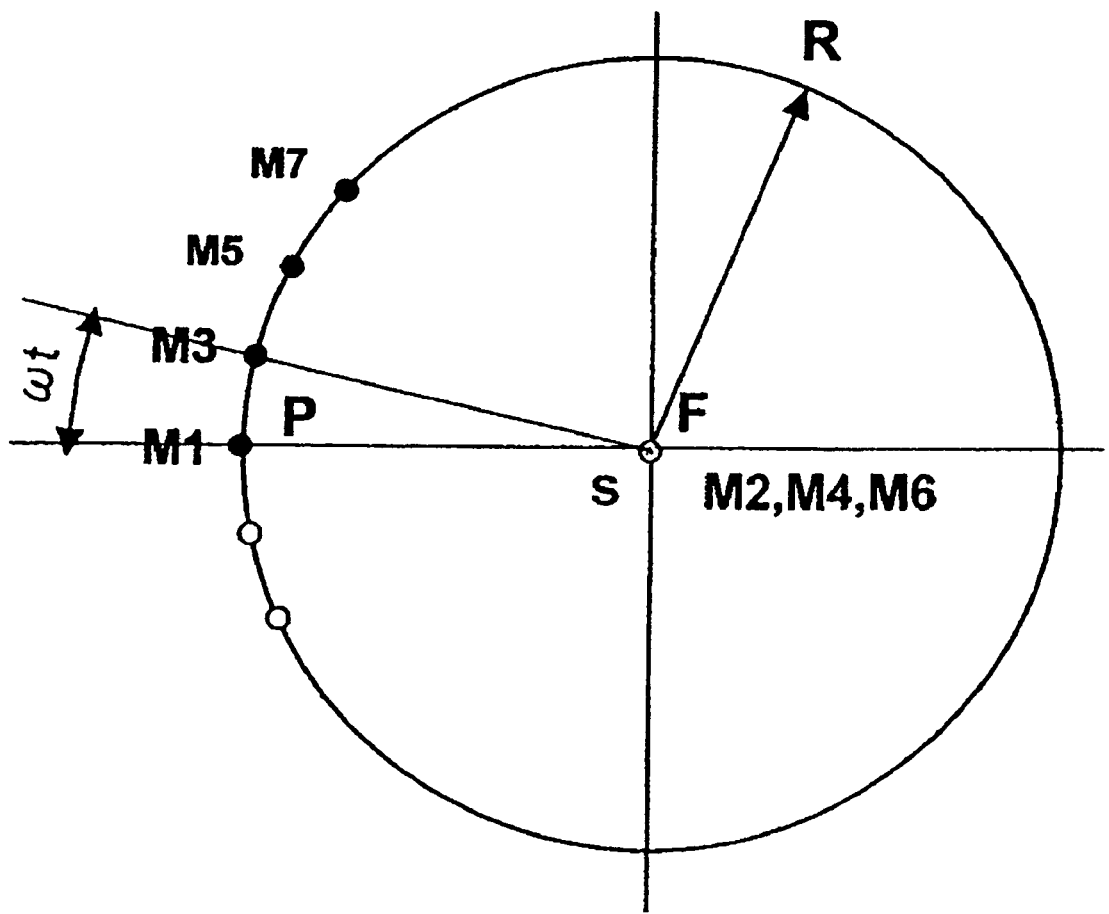
FIG. 6 is a different irradiation orbit chart showing a different procedure for irradiating the laser beams of the invention.
Figure 7:
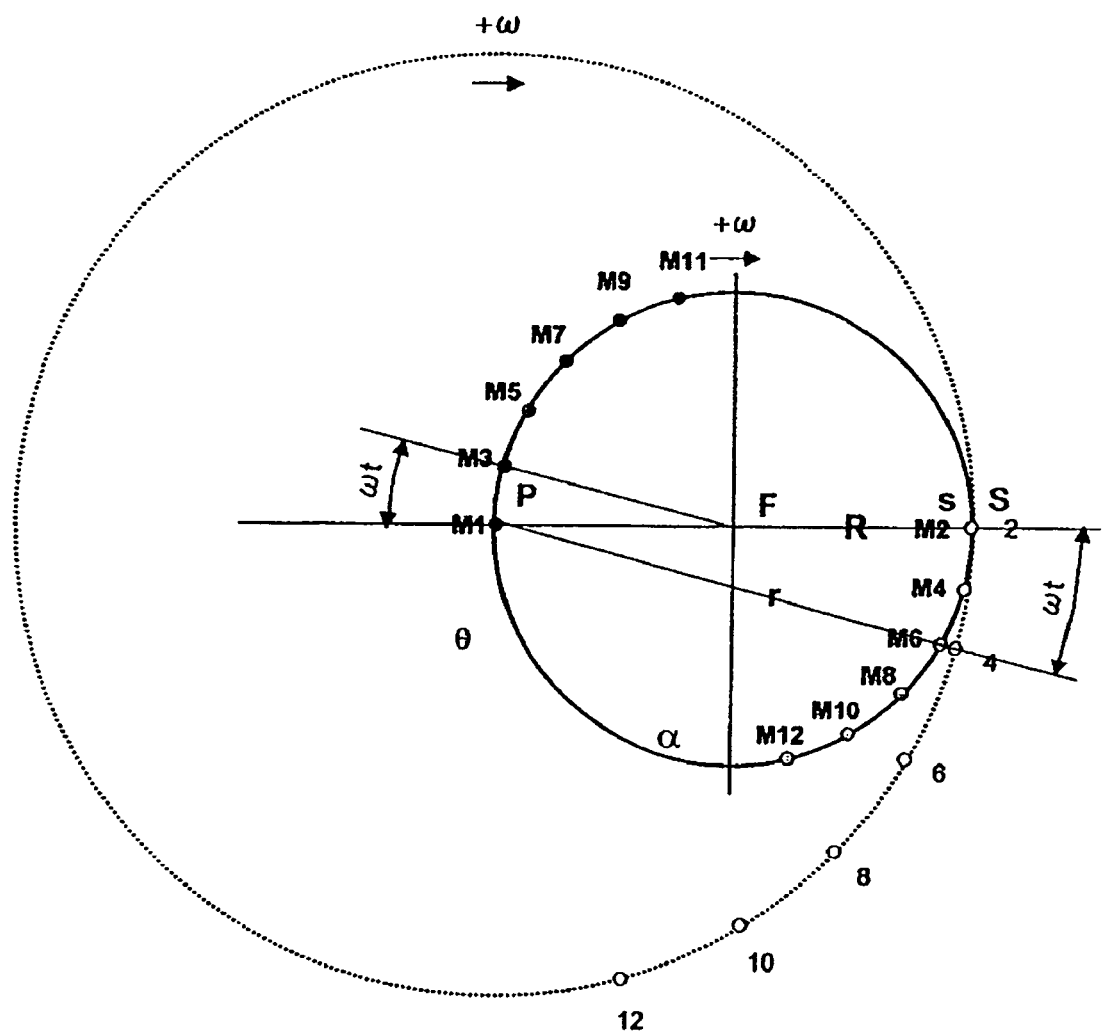
FIG. 7 is another irradiation orbit chart showing another procedure for irradiating the laser beams of the invention.

(d) Setting those values as $\theta=\pi/3$, $\alpha=\pi/30$ and $r=R$ allows the primary beam 5 to be moved on the orbit Z and the optical axis of the secondary beam 6 to be fixed at the center F of the orbit Z as shown in FIG. 6 (orbit of one punch and one trepanning). That is, it is possible to machine the center part by the secondary beam 6 while machining the outer periphery by the primary beam 5. It is noted that FIG. 6 shows a case in irradiating the laser beams per $\pi/12$ of rotation angle.

(e) Setting those values as $\theta=\pi$, $\alpha=\pi$ and $r=2R$ allows the primary beam 5 and the secondary beam 6 to be disposed at points symmetrically positioned about the center F on the orbit Z (orbit of two-beams and point symmetrical orbit trepanning). It avoids heat input from concentrating when the energy intensity of the primary beam 5 is equalized with that of the secondary beam 6 for example, so that the quality of the machined hole may be improved.

It is noted that length of circumference of the inner orbit is shorter than that of the outer orbit in machining one hole by a plurality of orbits. Accordingly, when the irradiation pitch is fixed in order to fix an amount of heat input per unit area, a relationship between a number of irradiations q on the outer orbit and a number of irradiations p on the inner orbit is $q\geq p$ and in most cases is $q>p$. That is, a number of irradiations of the laser beam machining the inside is smaller than a number of irradiations of the laser beam machining the outside in fixing the irradiation pitch. Accordingly, there is a case when the irradiation of the laser beam stops on the inner orbit, dropping the machining efficiency.

Figure 8:
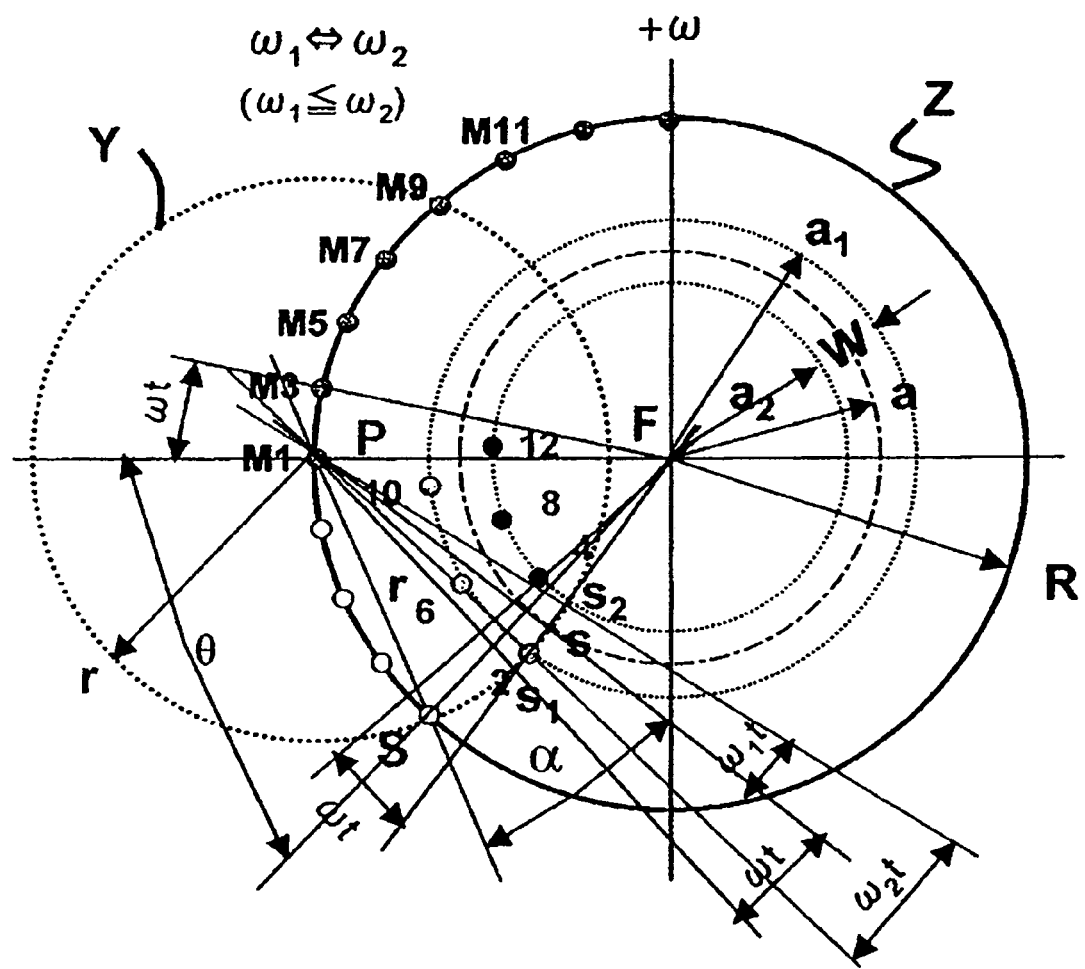
FIG. 8 is still another irradiation orbit chart showing still another procedure for irradiating the laser beams of the invention.

In such a case, it is possible to move the irradiation position of the secondary beam 6 on two orbits of a radius a1 and a radius a2 (radius a1=radius a2+W, where W is a difference between the radius a1 and the radius a2) centering on F as shown in FIG. 8 by moving the primary beam 5 on the orbit Z at angular velocity $\omega$ and moving the secondary beam 6 while switching the angular velocity $\omega 1$ and angular velocity $\omega 2$ alternatively (where $\omega 1 \leq \omega 2$ and $\omega 1+\omega 2=2\omega$) (orbit of two-beams and three-orbits trepanning). That is, it becomes unnecessary to thin out the secondary beam 6 like the case shown in FIG. 2 and to improve the machining efficiency by moving the secondary beam 6 on the two inner orbits while moving the primary beam 5 on the outer orbit.

Still more, because the irradiation intervals of the secondary beam 6 expand in the radial and circumferential directions, the energy density is averaged and quality of a hole bottom improves in machining a blind hole (hole with bottom).

It is noted that in the case of machining a through hole, the secondary beam 6 may be irradiated as it is without thinning because the inner peripheral side is removed.

By the way, although the present embodiment can improve the machining speed, it requires a laser oscillator having a large output because it splits one laser beam into two laser beams.

Second Embodiment

Figure 9:
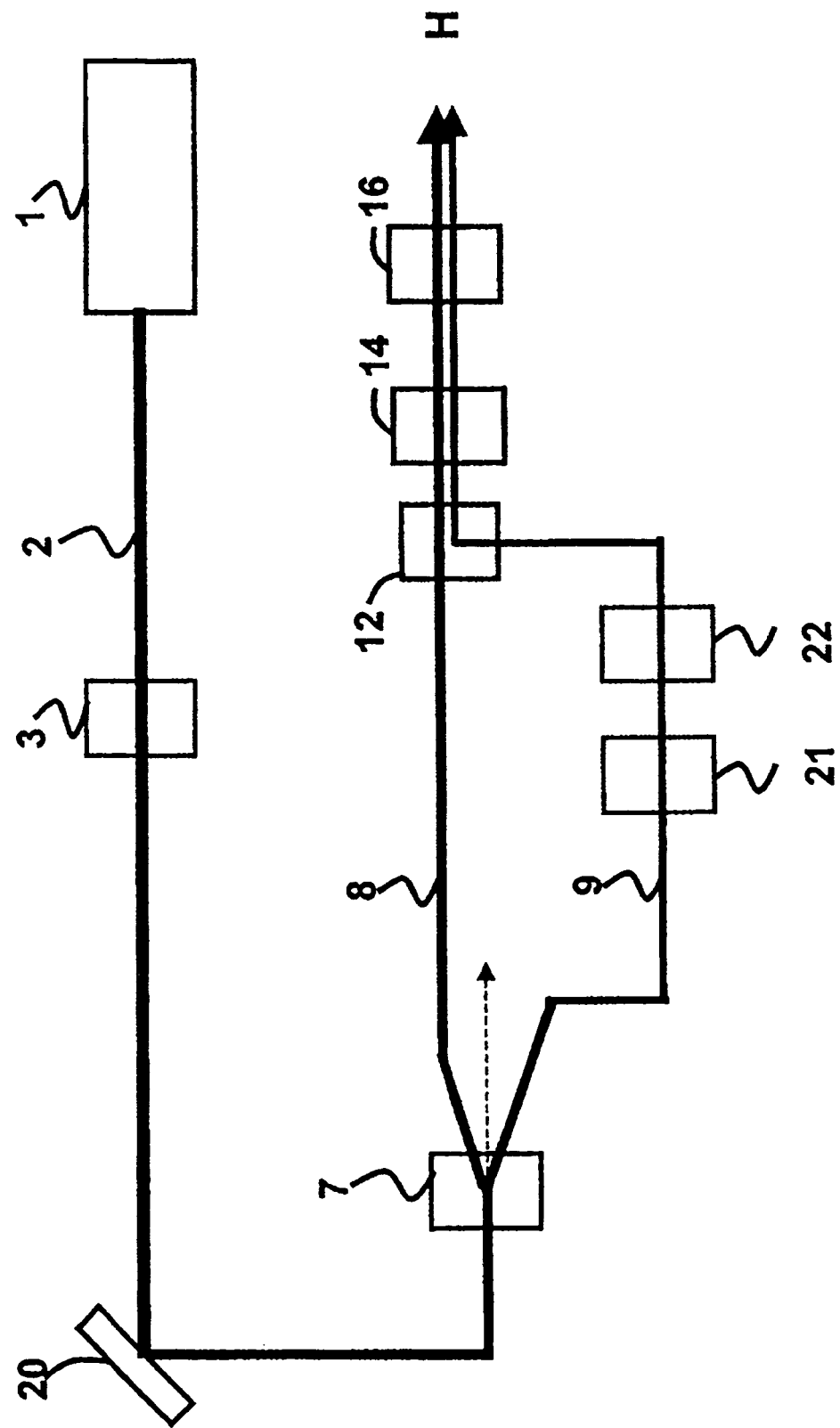
FIG. 9 is a diagram showing a configuration of an optical system of a second laser machining apparatus that can be suitably applied to the present invention.

FIG. 9 is a diagram showing a configuration of an optical system of a second laser machining apparatus that can be suitably applied to the present invention. The same components or those having the same function as those in FIG. 1 are denoted by the same reference numerals and an overlapped explanation thereof will be omitted here.

The P wave primary beam 2 outputted out of the laser oscillator 1 with oscillating frequency F passes through the beam-diameter adjuster 3 that adjusts an outer diameter thereof and is then reflected by a mirror 20. It is then split into two split beams 8 and 9 having frequency F/2 and different optical axes by an acousto-optic pulse modulator (AOM) 7. It is noted that the AOM 7 not only splits the primary beam into two split beams 8 and 9 but is also capable of controlling one pulse, i.e., pulse energy of the split beams 8 and 9.

The first split beam 8 enters the XY galvanic unit 12 of a head H. Still more, the second split beam 9 becomes an S wave primary beam by passing through deflecting means 21 that shifts (rotates) beam's polarizing direction by 90 degrees and enters the XY galvanic unit 12 by passing through the optical-length switching unit 22.

Because the split beam 8 is a P wave, it transmits through the XY galvanic unit 12 (that is, it is not positioned by the XY galvanic unit 12) and enters a XY galvanic unit 14 that positions the split beam 8 and enters the condensing f$\theta$ lens 16 that guides the optical axis of the split beam 8 into a direction vertical to a workpiece.

Meanwhile, the split beam 9 is an S wave, it is positioned by the XY galvanic unit 12 (less than 2 mm×2 mm in terms of machining area or 0.5 degree in terms of galvanic operation angle here) and enters the XY galvanic unit 14 that also positions the split beam 9. It then enters the condensing f$\theta$ lens 16 that guides the optical axis of the split beam 9 in the direction vertical to the workpiece.

The first split beam 8 will be referred to as 'primary beam' and the second split beam 9 as 'secondary beam' hereinafter.

The second embodiment is arranged so as not only to be able to separate the irradiation positions of the primary beam and the secondary beam in the same manner with the first embodiment, but also so as to alternately irradiate the primary beam and the secondary beam by the AOM 7. Therefore, it can moderate the increase of temperature at the machining hole further as compared to the case of the first embodiment.

The output of the laser oscillator may be half of that of the first embodiment.

It is noted that because the primary beam and the secondary beam are alternately irradiated in the case of the present embodiment, it is necessary to set the angle $\alpha$ that is an angle of shift in the radial direction of the secondary beam with respect to the primary beam at ($\alpha+\omega t/2$ or $\alpha-\omega t/2$) in order to irradiate the laser beams at the positions shown in FIGS. 2 through 8 described above.

By the way, according to the two embodiments described above, machining speed is the same with the conventional art even though it can improve the machining quality as compared to the conventional art. Then, a laser machining apparatus that is capable of improving the machining speed will be explained.

Third Embodiment

Figure 10:
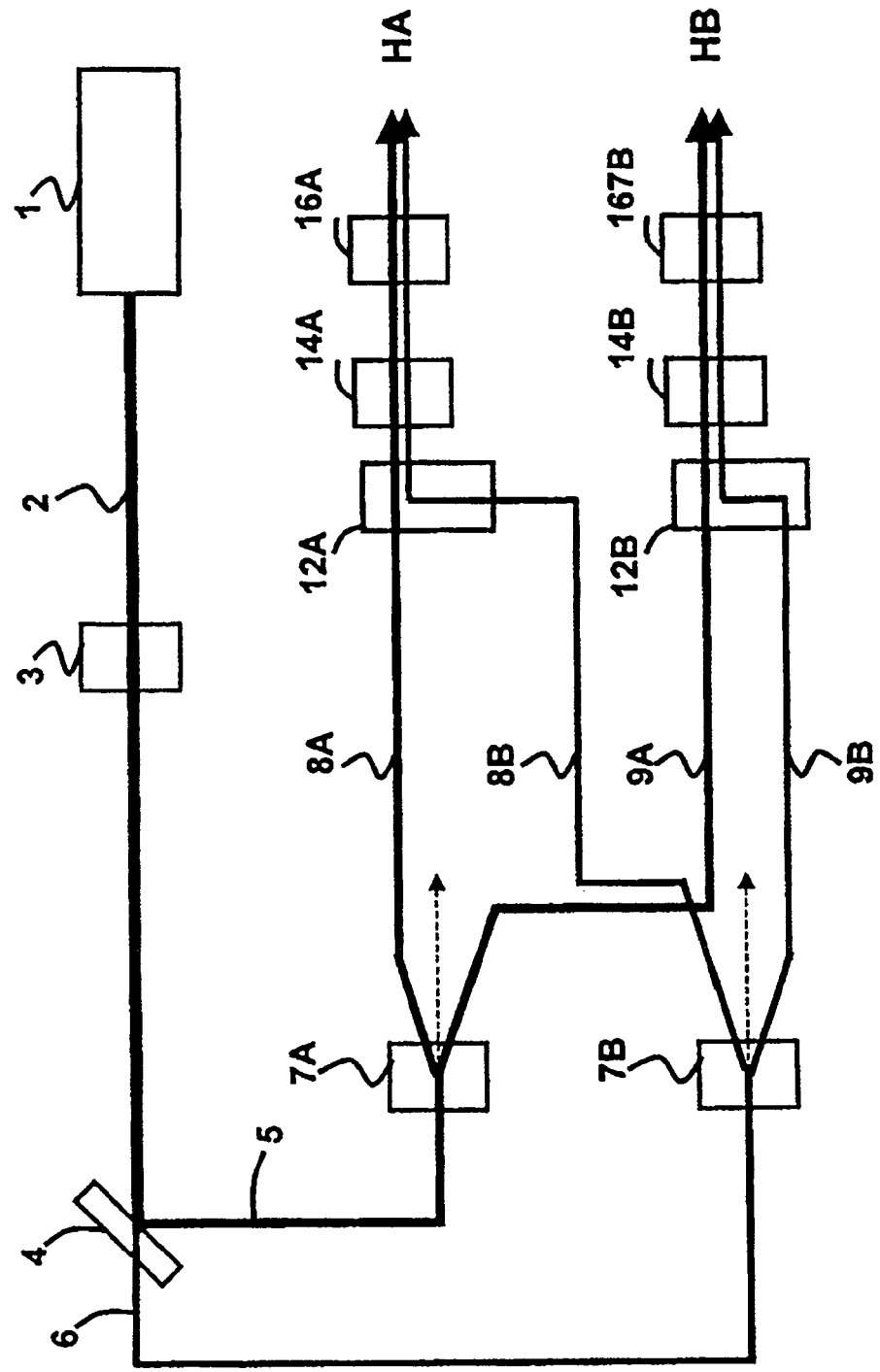
FIG. 10 is a diagram showing a configuration of an optical system of a third laser machining apparatus that can be suitably applied to the present invention.
Figure 11:
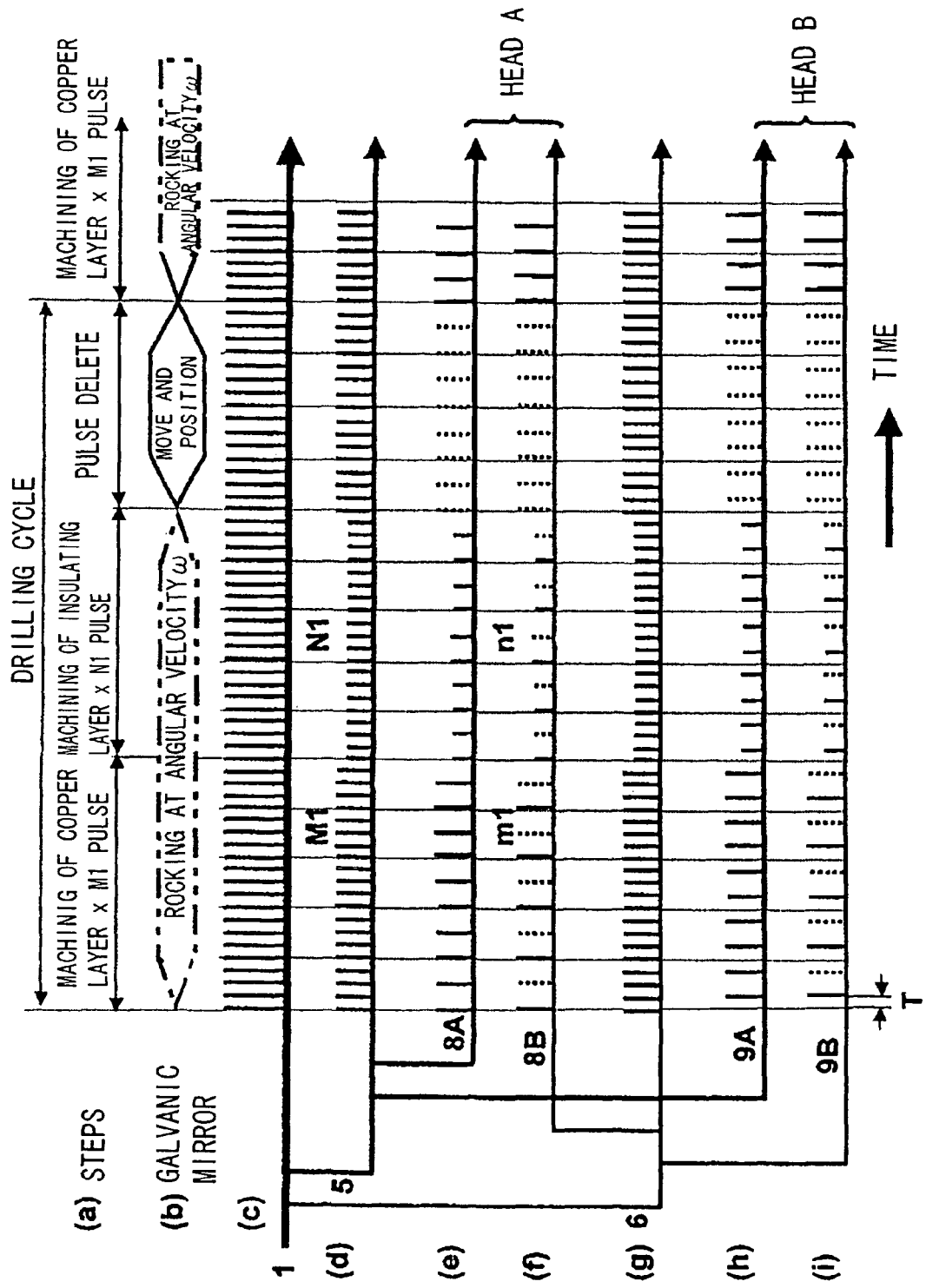
FIG. 11 is a chart showing one exemplary irradiation timing in trepanning by applying the invention.

FIG. 10 is a diagram showing a configuration of an optical system of a third laser machining apparatus that can be suitably applied to the present invention. The same components or those having the same functions with those in FIGS. 1 and 9 are denoted by the same reference numerals and an overlapped explanation thereof will be omitted here. It is noted that when there exist two components having the same function, they are differentiated by denoting subscripts A and B after their reference numerals. FIG. 11 is a chart showing one exemplary irradiation timing in carrying out trepanning by applying the invention, wherein (a) shows machining steps, (b) shows operations of the optical mirrors and (c) shows laser beams outputted out of the laser oscillator. Solid lines in (d) through (i) indicate intensity of each split beam irradiated to the machining hole and irradiation timing thereof, dotted lines therein indicate cases when no beam is irradiated to the machining hole and an axis of abscissa indicates time. It is noted that height in (c) through (i) indicates energy intensity.

As shown in FIG. 10, the laser beam outputted out of the laser oscillator is split by the beam splitter 4 into split beams 5 and 6. The first split beam 5 is then divided by an AOM 7A into two beams 8A and 9A and the secondary beam 6 is divided by an AOM 7B into two beams 8B and 9B in the third embodiment. The beams 8A and 8B are then led to a first head HA and the beams 9A and 9B are led to a second head HB. It is noted that in the present embodiment, energy intensity of the split beams 5 and 6 are equal and the AOMs 7A and 7B operate in synchronism. It is noted that the drilling cycle at this time is carried out by repeating positioning of the optical mirror and machining (machining of copper layer and insulating layer). Still more, the laser oscillator 1 outputs the laser beam with frequency of f.

Now, operations in the case of the head HA will be explained.

The beam 8A is irradiated by M1 times (10 times in the figure) per period 2T (where, T=1/f) and the beam 8B is irradiated by m1 times (5 times in the figure) per period 4T to machine the copper layer while rocking the optical mirror with an angular velocity of $\omega$. After ending to machine the copper layer, energy intensity is reduced as compared to the case of machining the copper layer, the beam 8A is irradiated by N1 times (10 times in the figure) per period 2T and the beam 8B is irradiated by n1 times (5 times in the figure) per period 4T to machine the insulating layer. When machining ends at that position, the optical mirror is moved to machine the next machining hole. Machining is thus continued in the same manner.

An operation of the head HB is what the operation of the head HA is shifted only by a period T.

In case of the present embodiment, the oscillated laser beam may be utilized fully without waste even if the oscillating frequency of the laser oscillator is 30 kHz and the response frequency for positioning the optical mirror is 15 kHz.

Still more, energy of the primary and the secondary beams may be varied without controlling the AOMs 7A and 7B by varying distribution ratio of the beam splitter 4 for example.

The present embodiment also allows the irradiation timing of the primary and secondary beams to be shifted in each of the heads HA and HB, it moderates the increase of temperature at the machining hole and can machine with excellent quality.

Still more, the embodiment is arranged so that the laser oscillator continuously oscillates pulses and the AOMs 7A and 7B dispose the non-used laser beams (shown by a dotted line in FIG. 10) even during the move and positioning of the optical mirrors, thermal stability of the laser oscillator and the optical system may be enhanced.

By the way, the first through third embodiments moderate the increase of temperature at the machining hole because the laser beams are irradiated to distant (separate) positions in trepanning, for example. However, when the output of the laser oscillator becomes large and the oscillating frequency becomes high, there arises an unavoidable case such that irregularity of the side face of the hole increases or the side face becomes like a beer barrel due to the rapid increase of temperature of the machining hole.

Next, a machining method that allows the machining quality to be improved further will be explained.

The inventors carried out the tests further and found adequate conditions for irradiating the laser beam to the same and one hole (machining similar to punching) to make a hole having the same diameter with the laser beam, as follows.

That is, in machining the insulating layer, energy density is set at 1.5 J/cm$^2$ or less (ideally 1.0 J/cm$^2$ or less) and a number of successive pulses at 10 pulses or less (ideally 5 pulses or less) are applied when the insulating layer is made of only resin. Then, energy density is set at 2 to 6 J/cm$^2$ or less (ideally 2 to 4 J/cm$^2$ or less) and a number of successive pulses at 5 pulses or less (ideally 3 pulses or less) are applied when the insulating layer is made of resin containing glass. By doing so, it is possible to make the wall face having excellent quality and to bring closer the diameter of the bottom of the hole to the diameter of the entrance of the hole. It is also possible to make the hole in which the glass fibers protruding into the hole are short and whose sidewall is straight in case of the resin containing glass fibers.

Still more, the relationship between the energy density and the number of times of successive irradiation is also applied in the case of trepanning when the interval of the irradiation position is 5 μm or less or is ⅕ or less of the diameter.

Still more, the temperature of the machining hole fully drops as the heat of the machining hole propagates to the surrounding part of the machining hole when a certain period of time elapses after irradiation of the laser.

Based on the results described above, the machining quality may be further improved by irradiating the laser beams as follows.

That is, the irradiation is carried out by setting in advance a maximum value L of irradiation interval of the laser beam (5 μm or ⅕ of the diameter of the laser beam for example), an allowable number of times N in successively irradiating the laser beam (5 times for example) and a rest period of time $T_0$. When the distance between the adjacent irradiation positions is equal to the maximum value L or less, the irradiation is rested for the rest period of time $T_0$ after irradiating the laser beam by the number of times N and then irradiation of the laser beam is started again. It is noted that although the maximum value L may be 0, it is the punching described above in this case. The rest period of time is found in advance by experiments.

Next, machining speed when the present invention is applied will be compared with that of the conventional cyclic machining described above in paragraph [0009]. It is assumed that machining conditions and performance of the machining apparatus are the same. Still more, positioning frequency of the optical mirror is 2 kHz.

Here, 40 pulses are irradiated to make one hole. It was also found by carrying out tests in advance that as the rest period of time $T_0$, a period corresponding to 11 pulses is appropriate when the oscillating frequency of the laser oscillator is 30 kHz and when the allowable number of times N=0 and a period corresponding to 6 pulses is appropriate when the allowable number of times N=5, respectively. That is, when the irradiation period combined with the rest period is set as 1 cycle and when the pulse irradiation interval is t, the following relationship holds; the irradiation period is $(N-1)_t$ and the rest period of time $T_0=(N+1)t$. The rest period of time $T_0$ must be the same rest period with the case when the oscillating frequency is 30 kHz when pulse energy intensity and successively irradiated number of pulses are the same, i.e., when the supplied energy is the same, even if the oscillating frequency of the laser oscillator is 30 kHz or more. It is noted that this is based on the case when the oscillating frequency is 30 kHz because the oscillating frequency of the laser oscillator presently used most is 30 kHz.

(1) When the allowable number of times N=10 (when the insulating layer is made of only resin), it is necessary to irradiate the laser by dividing into four times to complete the machining, so that three times of rest period of time $T_0$ is necessary. One time of positioning of the optical mirror is also required.

When the oscillating frequency of the laser oscillator is 30 kHz, it takes 2.8 ms to machine one hole, so that it is possible to increase the speed by 0.4 ms (14%) as compared to 3.2 ms in the case of the conventional cyclic machining.

When the oscillating frequency of the laser oscillator is 60 kHz, it takes 2.2 ms to machine one hole, so that it is possible to increase the speed by 0.4 ms (18%) as compared to 2.6 ms of the conventional cyclic machining even though the same rest period of time $T_0$ with the case of 30 kHz is necessary.

(2) When the allowable number of times N=5 (when the insulating layer contains glass fibers), it is necessary to irradiate the laser by dividing into 8 times in order to complete the machining (40/5=8), so that seven times of rest period of time $T_0$ is necessary. One time of positioning of the optical mirror is also required.

When the oscillating frequency of the laser oscillator is 30 kHz, it takes 3.0 ms to machine one hole, so that it is possible to increase the speed by 2.1 ms (71%) as compared to 5.1 ms in case of the conventional cyclic machining.

When the oscillating frequency of the laser oscillator is 60 kHz, it takes 2.4 ms to machine one hole, so that it is possible to increase the speed by 2.1 ms (86%) as compared to 4.5 ms of the conventional cyclic machining.

It is noted that although the number of times of the irradiation period has been four by setting as N=10 here, N may be smaller than 10 or may be gradually reduced.

As shown in (1) and (2) described above, according to the present invention, the higher the oscillating frequency of the laser oscillator, the more the efficiency may be improved as compared to the conventional cyclic machining.

The longer the rest period of time $T_0$, the smaller the radius of a curved face formed between the sidewall and the hole bottom becomes in general. That is, the diameter of the hole bottom may be brought closer to the diameter of the entrance or the center part of the sidewall, so that the machining quality is improved. However, it is desirable to shorten the rest period of time $T_0$ in order to improve the machining efficiency. Then, it is possible to improve the machining efficiency without lowering the quality by setting the rest period of time $T_0$ as $(N+1)t$ as explained in the present embodiment. Still more, it is possible to effectively use most of the laser oscillated from the laser oscillator because the laser is supplied alternately to the two holes.

It is noted that when the optical system of the laser machining apparatus is as shown in FIG. 10 and when punching is carried out, the laser beam may be irradiated to another machining hole while one laser beam is taking a rest.

Figure 12:
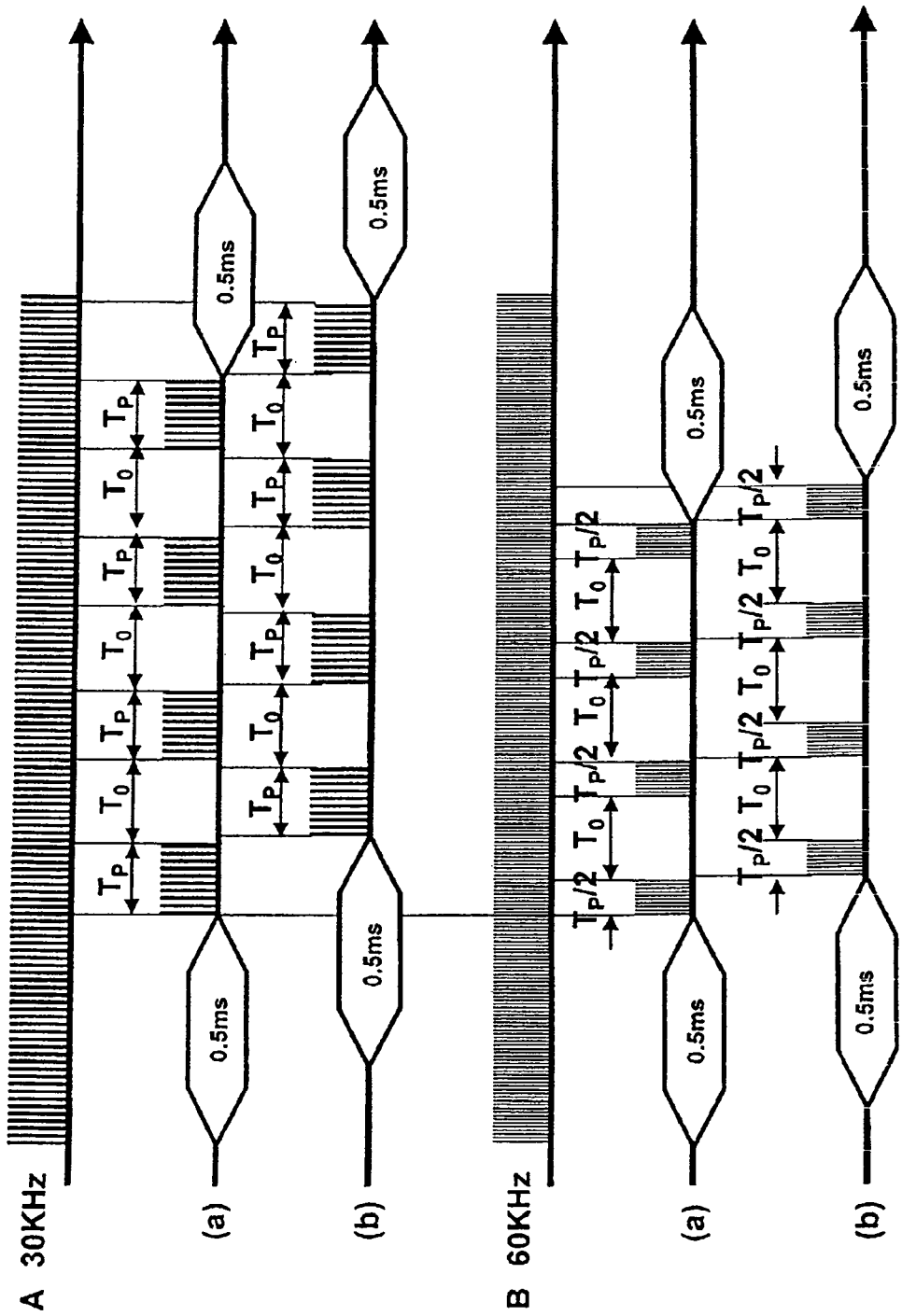
FIG. 12 is a chart showing one exemplary irradiation timing in punching resin by applying the invention.

FIG. 12 is a chart showing one exemplary irradiation timing in punching (successive numbers of irradiation of one time is 10 pulses, machine by 40 pulses in total) resin by applying the invention. An upper stage A shows pulses when the oscillating frequency of the laser oscillator is 30 kHz and a lower stage B shows pulses when the oscillating frequency of the laser oscillator is 60 kHz, and (a) indicates the beam 8A and (b) indicates the beam 9A, respectively.

As shown in the figure, it is possible to use the laser beam outputted out of the laser oscillator without waste by supplying the beam 8B to the head HB during a period in which no beam 8A is supplied to the head HA.

It is noted that a number of pulses or energy intensity of the laser beam supplied to the head HA or HB may be adequately selected.

Still more, when the oscillating frequency increases along with an increase of the power of the laser oscillator, it is possible to use the laser beam outputted out of the laser oscillator without waste by increasing a number of heads.

Still more, when positions of two different holes are very close to each other in FIG. 9, it is possible to use the laser beam outputted out of the laser oscillator without waste as shown in FIG. 12.

Fourth Embodiment

FIG. 13 is a diagram showing a configuration of an optical system of a fourth laser machining apparatus that can be suitably applied to the present invention. This shows a configuration of the optical system of the laser machining apparatus that is a modification of that shown in FIG. 10.

The optical system of the laser machining apparatus shown in the figure is that in which an AOM 7 is used instead of the beam splitter 4 in FIG. 10, a beam splitter 4A is used instead of the AOM 7A and a beam splitter 4B is used instead of the AOM 7B, respectively.

It is noted that the operation of this laser machining apparatus may be readily understood from the first through third embodiments, so that its detailed explanation will be omitted here.

It is noted that when an AOD capable of controlling the distribution angle is adopted instead of the AOM 7, the output direction of the laser beam outputted out of the AOD may be distributed not only in two directions but also in three or more directions.

Still more, although the case of machining the hole has been explained above, the invention is applicable not only to the case of machining a hole but also to a case of machining a groove and a plane (in exposing a positioning fiducial mark disposed as part of an inner copper layer for example) or to a case of machining a surface such as removal of a silicon (Si) oxide film.

Although the invention has been described by way of the exemplary embodiments, it should be understood that those skilled in the art might make many changes and substitutions without departing from the spirit and scope of the invention. It is obvious from the definition of the appended claims that the embodiments with such modifications also belong to the scope of the invention.

What is claimed is:

1. A laser machining method of trepanning a hole in a workpiece using a first pulsed laser beam with an irradiation position positioned by a first XY galvanic unit, and by using a second pulsed laser beam with an irradiation position positioned by the first XY galvanic unit and a second XY galvanic unit, each of the first XY galvanic unit and the second XY galvanic unit having a galvanic mirror, the hole having a diameter larger than a diameter of the first pulsed laser and the second pulsed laser, said method comprising:
    adjusting the first XY galvanic unit so that the first pulsed laser beam draws a first circular orbit having a first radius;
    adjusting the second XY galvanic unit so that the second pulsed laser beam draws a second circular orbit having a second radius, the second circular orbit being centered on the irradiation position of the first pulsed laser beam; and
    irradiating the first pulsed laser beam and the second pulsed laser beam toward the workpiece at predetermined time intervals on the first circular orbit and the second circular orbit, respectively, while always rocking the galvanic mirror of each of the first XY galvanic unit and the second XY galvanic unit so as to position the irradiation position of the first pulsed laser beam using the first XY galvanic unit and so as to position the irradiation position of the second pulsed laser beam using the first XY galvanic unit and the second XY galvanic unit to thereby trepan the hole in the workpiece.

2. The laser machining method of claim 1, further comprising moving the first pulsed laser beam and the second pulsed laser beam in the same direction on respective orbits and with the same angular velocity.

3. The laser machining method of claim 1, further comprising moving the second pulsed laser beam along the second circular orbit located inside the first circular orbit while moving the first pulsed laser beam along the first circular orbit.

4. The laser machining method of claim 1, wherein said irradiating of the first pulsed laser beam and said irradiating of the second pulsed laser beam comprise irradiating such that each of the first pulsed laser beam and the second pulsed laser beam have varying values of energy intensity.

5. The laser machining method of claim 1, further comprising forming the first pulsed laser beam and the second pulsed laser beam as time-shared laser beams outputted from the same single laser oscillator.

6. The laser machining method of claim 1, further comprising outputting a single pulse laser beam from a laser oscillator such that the single pulse laser beam is applied to at least one of a beam splitter and a half-mirror, and forming split beams from the single pulse laser beam using the at least one of the beam splitter and the half-mirror, the split beams comprising the first pulsed laser beam and the second pulsed laser beam.

7. The laser machining method of claim 1, wherein the first pulsed laser beam is irradiated to first positions on the workpiece and the second pulsed laser beam is irradiated to second positions on the workpiece, each of the second positions being located a predetermined distance from a respective one of the first positions, the predetermined distance being determined prior to determining any of the first positions of the first pulsed laser beam.

8. The laser machining method of claim 7, wherein said laser machining method comprises only irradiating the first pulsed laser beam and the second pulsed laser beam, and said irradiating is performed such that all of the second positions are spaced apart a predetermined distance from the first positions.

* * * * *